United States Patent [19]

Carlson et al.

[11] Patent Number: 4,772,357

[45] Date of Patent: Sep. 20, 1988

[54] SYSTEM FOR AUTOMATICALLY ETCHING PIECES

[75] Inventors: Gary A. Carlson, Minnetonka, Minn.; Robert E. Mesick, San Diego, Calif.

[73] Assignee: Robbins & Craig Welding & Mfg. Co., South El Monte, Calif.

[21] Appl. No.: 59,113

[22] Filed: Jun. 8, 1987

[51] Int. Cl.⁴ .................. B44C 1/22; C03C 15/00; C03C 25/06

[52] U.S. Cl. .................... 156/626; 134/30; 134/39; 134/61; 134/105; 156/638; 156/639; 156/642; 156/646; 156/668; 156/345

[58] Field of Search ............... 156/629, 633, 638, 626, 156/639, 642, 646, 654, 668, 345; 134/10, 26, 31, 30, 39, 40, 56 R, 61, 64 R, 105

[56] References Cited

U.S. PATENT DOCUMENTS 3,163,572  12/1964  David ............................ 156/345
3,668,130  6/1972  Kadison et al. .............. 156/642 X
4,637,856  1/1987  Lombardo et al. .......... 156/637

Primary Examiner—William A. Powell
Attorney, Agent, or Firm—Price, Gess & Ubell

[57] ABSTRACT

A plurality of work stations enable an operator to remotely control the processing of etching work pieces. Nine work stations are provided. The first station is for loading and unloading. The second station is for heating and drying. The third, fifth, and sixth stations are for washing. The fourth and seventh stations are for rinsing. The eighth station is for etching. The ninth station is for degreasing.

45 Claims, 3 Drawing Sheets

SYSTEM FOR AUTOMATICALLY ETCHING PIECES

BACKGROUND OF THE INVENTION

1. Field of the Invention

The present invention relates generally to the etching of pieces and, more specifically, to an improved method and apparatus for remotely controlling the chemical etching of pieces among a plurality of work stations.

2. Description of Related Art

In the industrial chemical environment, as well in other environments, the use of various chemicals have posed serious health hazards to the operators involved in the chemical processes. Frequently, the processes require the utilization of chemicals that are highly toxic and potentially carcinogenic. Other chemicals present a high risk of fire, especially when in the presence of electric motors and the like which can produce sparks and ignite the chemicals.

In the specific area of etching fluorocarbon or teflon pieces that are to be bonded, the above problems have been apparent because the prior art assemblies have required operators to be in close proximity to the working chemical solvents. In that environment, operators have been exposed to undesirable levels of toxic compounds such as napthalene and glycol dialkylethers. Where such exposure has been continuous over prolonged periods of time, the health hazards have been exacerbated.

An equally hazardous problem has been the potential for fires that can be fueled by one or more of the solvents used during the etching process. For example, alcohol compounds can produce a visibly undetectable fire. Such fires obviously present a significant hazard in that the fire is not easily susceptible to detection by an operator.

A need still exists in the art to provide an apparatus system that can be remotely controlled during the etching process and thereby minimize health and property damage hazards.

SUMMARY OF THE INVENTION

An object of the present invention is to provide an improved method and system for the etching of pieces to permit their bonding.

Another object of the present invention is to provide a remotely controlled system for the etching of fluorocarbon or teflon pieces.

An even further object of the present invention is to provide an etching assembly that minimizes the amount of an operator's exposure to toxic substances.

An additional object of the present invention is to provide an etching assembly that minimizes the time required for the etching process, and minimizes the amount of chemical solvents required for the etching process.

The objects of the present invention are particularly accomplished by a method of degreasing the pieces; heating the pieces; removing fluorine from the surfaces of the pieces, the step of removing flourine occurring within a sealed environment; washing the pieces at least twice with a washing solution including an alcohol compound, the step of washing occurring within a sealed environment; rinsing the pieces with a rinsing solution at least twice, the rinsing solution including reverse osmosis water; and remotely controlling the steps of degreasing, heating, washing, and rinsing among a plurality of stations.

The objects of the present invention are also accomplished by a first station for loading and unloading the pieces; a second station for drying and heating the pieces; at least one third station for washing the pieces; at least one fourth station for rinsing the pieces; a fifth station for altering the chemical composition of the surfaces of the pieces; a sixth station for degreasing the pieces; and means for remotely controlling the movement of the pieces among the stations.

These and other objects of the present invention can best be seen from an examination of the accompanying specification, claims, and drawings.

DESCRIPTION OF THE PREFERRED EMBODIMENT

The following description is provided to enable any persons skilled in the chemical and mechanical fields to make and use the present invention and sets forth the best mode contemplated by the inventors of carrying out their invention. Various modifications, however, will remain readily apparent to those skilled in the art, since the generic principles of the present invention have been defined herein specifically to provide an improved automated system and method for etching pieces.

Although the following description is in the context of etching fluorocarbon or teflon pieces by the use of a particular etchant solution sold under the trade name "TETRA-ETCH," those skilled in the art will readily understand that the present invention can be applied in contexts other than etching, and other than etching fluorocarbon pieces with "TETRA-ETCH."

Figure 1:
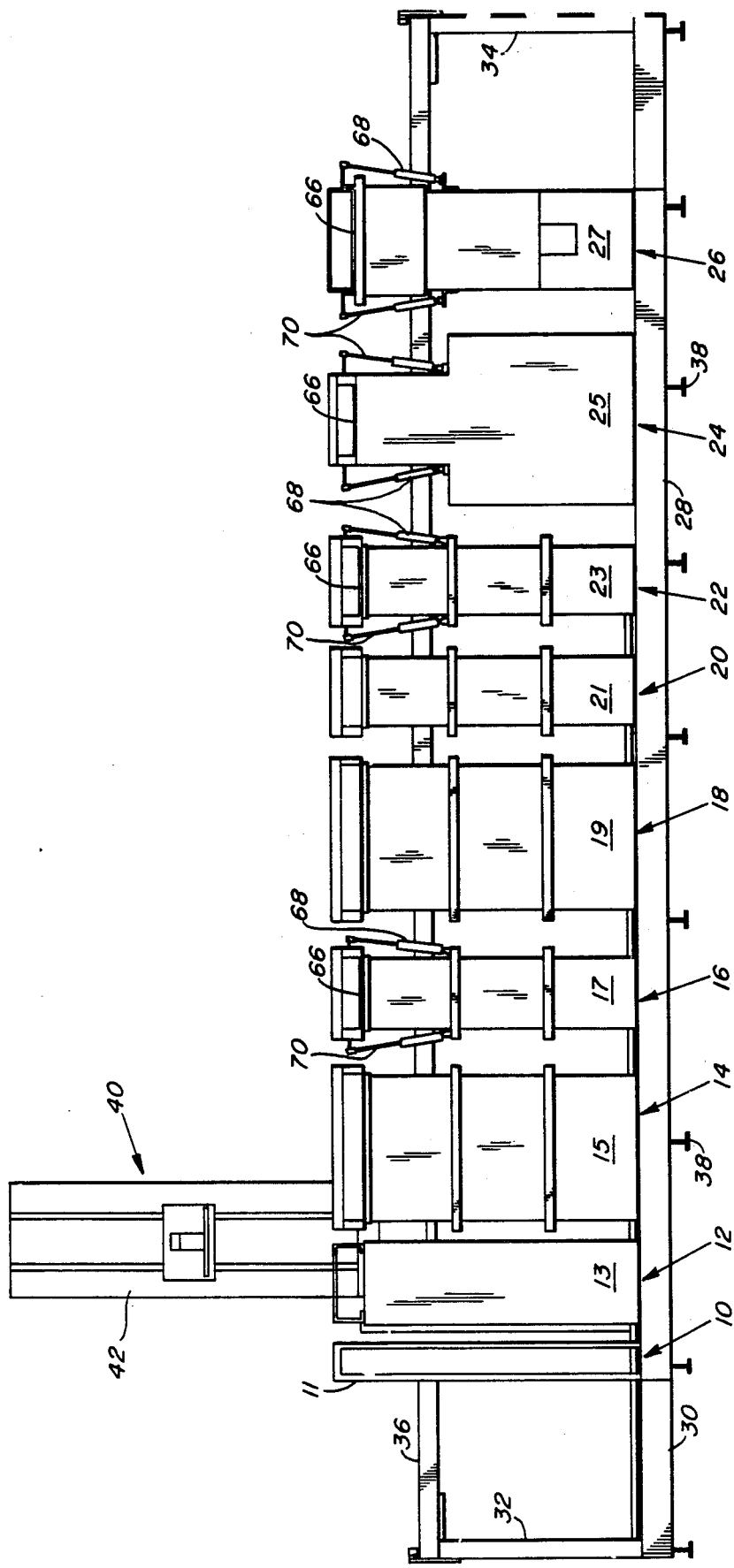
FIG. 1 is a side view of the present invention.

In FIG. 1, the present invention is shown as an assembly that includes a plurality of work stations among which the pieces are moved. A first station 10 is provided on the far left side of the assembly, when viewed from FIG. 1. The first station 10 provides a work place at which the pieces to be treated can be manually loaded and unloaded into the assembly, as further described below. The first station 10 is depicted in the present embodiment as having a generally rectangular shaped housing 11 preferably made of stainless steel which is similar to those of the remaining work stations hereinafter described.

A second station 12 is positioned immediately adjacent to and on the right side of the first station 10, when viewed from FIG. 1. The second station 12 has a housing 13 and includes an air driven blower (not shown) that can dry and heat the pieces at certain times during the process as further described below. Preferably, in this particular embodiment, the second station 12 can heat the interior environment within the housing 13 to a temperature range of 120° to 150° F. for up to approximately five minutes. It is understood that the particular temperature range and duration of heat can be appropriately varied depending upon, among other things, the particular material out of which the pieces are constructed and the number of pieces being treated at any one particular time.

Figure 2:
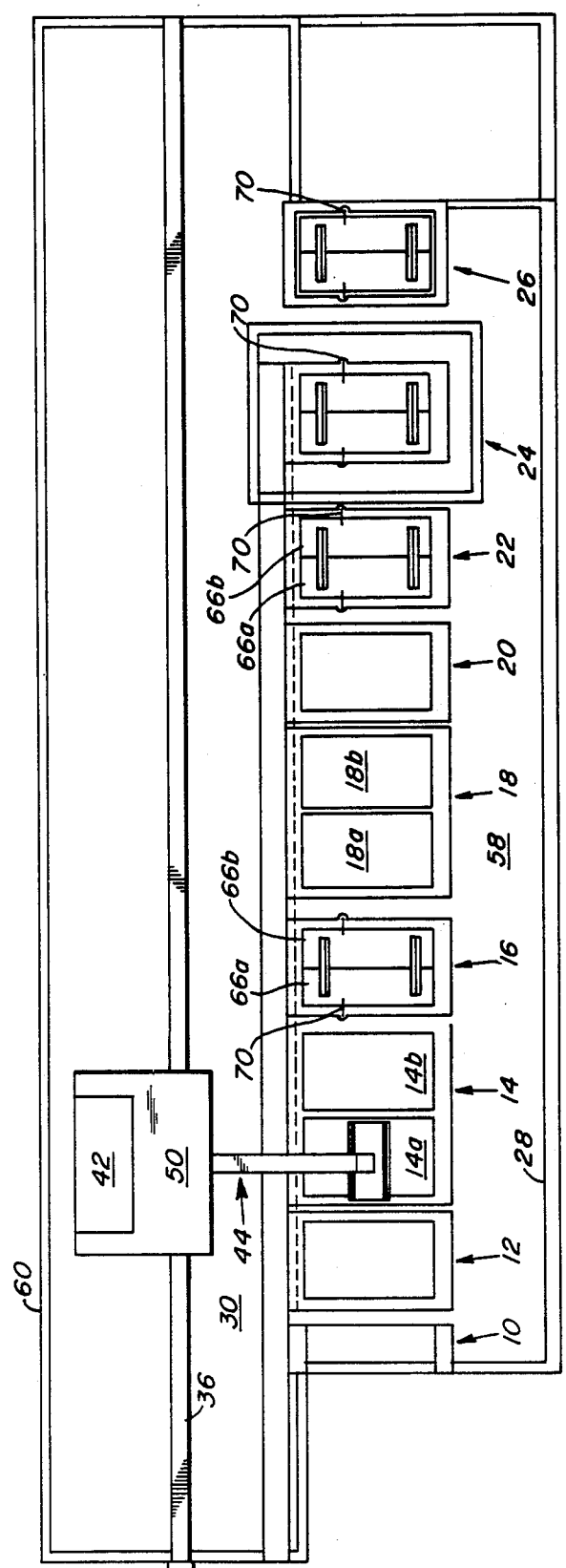
FIG. 2 is a top, plan view of the present invention.

A third station 14 is positioned immediately adjacent to and on the right side of the second station 12, when viewed from FIG. 1. As shown in FIG. 2, the third station 14 is generally described by a housing 15 and a first portion 14a and a second portion 14b. The two portions 14a, 14b are constructed in a manner that is conventional in the art to provide a liquid counter-flow rinse over the pieces. The rinse removes undesired metallic and organic compounds from the pieces, and in this embodiment, continues for up to ten minutes.

Figure 4:
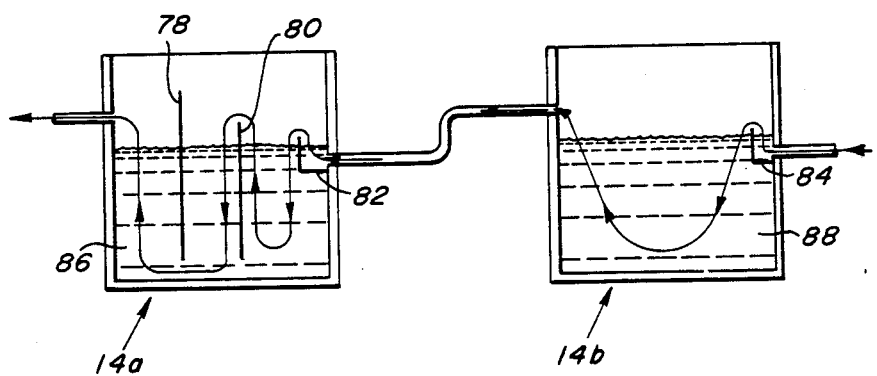
FIG. 4 depicts the counter-flow rinsing in a work station.

While other designs are contemplated by the present invention, in this particular embodiment, as shown in FIG. 4, the portion 14a includes a wall 78 and a wall 80, the former being greater in height than the latter. The portion 14a also includes an "L"-shaped ledge 82 disposed near the side of the portion 14a immediately adjacent the portion 14b. The portion 14b includes an "L"-shaped ledge 84 positioned at a side of the portion 14b opposite the ledge 82.

A recirculating pump system (not shown), which is preferably air driven, is provided to circulate reverse osmosis water in the direction and fashion depicted by the arrows in FIG. 4, as well as maintain a minimum level of water in the station 14. When viewed from FIG. 4, the reverse osmosis water is pumped into the portion 14b from its right side and onto the ledge 84. The reverse osmosis moves over the ledge 84 and into the portion 14b to form a reservoir 88 of reverse osmosis water. When the reservoir 88 reaches a predetermined level, the reverse osmosis water then moves into the portion 14a and onto the ledge 82. As the reverse osmosis water continues to pump onto the ledge 82 and over it, the reverse osmosis water forms a reservoir 86 in the portion 14a. The reverse osmosis water level of the reservoir 86 may then exceed a level in excess of the height of the wall 80 and thereby move over the wall 80. Because the wall 78 is greater in height than the wall 80, the reverse osmosis water then flows underneath the wall 78 and exits the portion 14a.

The third station 14 is also provided preferably with an air sparger (not shown) to increase the rinsing action by bubbling air into the reservoir 88 where the pieces will be placed for rinsing. Although the present invention contemplates other designs, the air sparger may consist simply of a pressurized air source and an air line into the reservoir 88.

A fourth station 16 is provided for washing the pieces and is immediately adjacent to and on the right side of the third station 14, when viewed from FIG. 1. The fourth station 16 includes a housing 17 that is enclosed by a cover 66. As shown in FIG. 2, the cover 66 includes a portion 66a and a portion 66b, both of which are hinged along opposing edges of the housing 17 to permit their opening and closing by a pneumatic assembly. The pneumatic assembly includes a pair of pneumatic cylinders 68 and a pair of pneumatic arms 70. The cover 66 is opened by the pneumatic cylinders 68 and the pneumatic arms 70 when the pieces are to be moved into the fourth station 16. While the pieces remain within the fourth station 16, the cover 66 can be closed and thereby provide a sealed environment within the fourth station 16. The sealed environment minimizes the amount of toxic vapors from a washing solution described below.

A feed pump (not shown) is provided in connection with the fourth station 16 to circulate a washing solution through the fourth station 16, into a seventh station 22 described below, through a carbon treatment area to remove contaminants (not shown), and then back to the fourth station 16. In this particular emobidment, the washing solution includes an alcohol compound and is preferably isopropyl alcohol. The pieces are washed with the washing solution for up to approximately five minutes to effect removal of undesired organic compounds on tne pieces. Condensation coils (not shown) are also provided with respect to the fourth station 16. The condensation coils, which are of any appropriate conventional design, limit the amount of evaporation from the alcohol washing solution and thereby minimize the health hazard to an operator, as well as minimize the possibility of a fire. To sense the presence of an alcohol fueled fire, an ultraviolet fire detection system (not shown), of any appropriate conventional design, such as that utilizing carbon dioxide, is provided in connection with the fourth station 16.

The fourth station 16 is also provided with a nitrogen purge system to fill the interior of the fourth station 16 with nitrogen gas and thus provide an inert environment within which the pieces may be washed. The purge system also assists in removing vaporized washing solution. The nitrogen environment and vaporized washing solution can be removed by an exhaust system (FIG. 3) that includes a push exhaust 74 and a pull exhaust 72. The push exhaust 74 creates a pressure greater than the interior pressure of the fourth station 16 while the pull exhaust 72 creates a lower pressure than that of the interior environment, both of which thereby enable the nitrogen gas and vaporized washing solution to be purged from the fourth station 16. In addition, the fourth station 16 is provided with a system (not shown) to manually fill the interior environment with reverse osmosis water for cleaning the fourth station after several uses. A drain 76 is provided to drain the solutions from the fourth station 16.

A fifth station 18 is provided immediately adjacent to and on the right side of the fourth station 16, when viewed from FIG. 1. The fifth station 18 is enclosed by a housing 19 and includes a portion 18a and another portion 18b. The fifth station 18 provides a counter-flow rinsing solution of reverse osmosis water, as in the third station 14. A pump system (not shown), which is preferably air driven, is provided in connection with the fifth station 18 to pump the reverse osmosis water from a sixth station 20 described below and to a carbon treatment area (not shown) for removal of contaminants, then to the fifth station 18, then to the third station 14, and back to the sixth station 20. Thus, the reverse osmosis water can be reused several times among the various stations that rinse the pieces prior to disposal of the rinsing solution.

The sixth station 20 is provided immediately adjacent to and on the right side of the fifth station 18, when viewed from FIG. 1. The sixth station 20 is enclosed by a housing 23 and serves to stagnant rinse the pieces with reverse osmosis water, preferably for up to five minutes. The sixth station can be manually filled with reverse osmosis water and includes an air sparger, like that described above.

A seventh station 22 is provided immediately adjacent and on the right side of the sixth station 20. The seventh station 22 like the fourth station 16, provides an alcohol washing solution for the pieces and is enclosed by a housing 23 and a cover 66 that can be opened and closed by a pneumatic assembly. As with the fourth station 16, the seventh station 22 includes condensation coils, a nitrogen purge system, an ultraviolet fire detection system, a recirculating pump, and a system for manually filling the station with reverse osmosis water.

An eighth station 24 is provided immediately adjacent to and on the right side of the seventh station 22, when viewed from FIG. 1. The eighth station 24 is enclosed by a housing 25 and a cover 66 that can be opened and closed by a pneumatic assembly, like that described above. The eighth station 24 circulates an etchant solution which, when placed in contact with the pieces, alters the chemical composition of the surfaces of the pieces. The element solution treatment occurs preferably for up to five minutes. The chemical composition is changed to expose various functional groups. The functional groups, in the context of fluorocarbon or teflon pieces, include hydroxyls, carbonyls, and carboxyls. As is readily known in the art, an etchant solution that removes flourine atoms from the surface of the pieces will result in the functional groups being exposed at the surfaces of the pieces. In so doing, the pieces then become more readily susceptible to bonding to other pieces or other elements.

As in the above described stations, the eighth station 24 is provided with a nitrogen purge system to provide an inert environment within which the etchant solution may work, in addition to removing the vaporized etchant solution. A colorimeter is provided in conjunction with the eighth station 24 and is of any conventional design in the art which enables the sensing of the concentration of the active agents in the etchant solution without having to take a sample of the etchant solution out of the eigth station 24. A viscometer, which is of any appropriate conventional design in the art, is also provided to sense the viscosity of the etchant solution, the viscosity being indicative of the amount of contaminants and degradation products in the etchant solution and therefore the degree of fluorine removal from the pieces.

In this particular embodiment, the etchant solution TETRA-ETCH contains napthalene and glycol dialkylether, both of which are hazardous when inhaled. Therefore, the eighth station 24 is further provided with a condensing system to minimize the amount of vaporization of the etchant solution. An appropriate conventional ultraviolet fire detection system is additionally provided in connection with the eighth station 24, as are an oxygen sensor system and humidity sensor system. The humidity detection system is conventional and monitors the presence of water within the eighth station 24 which would otherwise render the TETRA-ETCH less effective. Oxygen will react with TETRA-ETCH and also render the etchant solution less reactive with the pieces. The oxygen sensor system is also conventional and is provided to monitor the presence of oxygen within the eighth station 24 to thereby determine the adequacy of the inert environment.

In addition, a heating/cooling system is provided in conjunction with the eighth station 24 to generally control the temperature of the interior environment of such station and more particularly the temperature of the etchant solution. TETRA-ETCH, like other etchant solutions, has particular usefullness at a specific temperature range and therefore must be heated or cooled to obtain such temperature range without creating hot spots in the solution.

A ninth station 26 is provided immediately adjacent to and on the right side of the eighth station 24. The ninth station 26 is enclosed by a housing 27 and a cover 66 that is operable by a pneumatic assembly, like that described above. The ninth station 26 provides a vapor degreasing of the pieces preferably for up to five minutes at a temperature of approximately 85°–150° F. This step removes greases and oils from the pieces. A sump (not shown) provides a source for the degreasing agent. In this particular embodiment, freon 113 is the agent. A condensor coil system (not shown) is provided in connection with the ninth station 26 to control the amount of the freon in gaseous form. A thermostat system (not shown) is provided to control the input of heat to the sump and thereby the vaporization of the degreasing solution.

All of the work stations are supported on a support structure that includes a base member 28 which is supported by a plurality of foot members 38. The base member 28 includes a pump and plumbing area 58 in which various pumping and plumbing connections among the work stations are disposed. A base member 30 is provided immediately adjacent to the base member 28 and supports a pair of side supports 32, 34 fixed at either end of the base member 30. A top support 36 is supported by the side supports 32, 34 and extends along the longitudinal length of the base member 30.

A carrier assembly 40 is supported by the top support 36 and can be moved along the longitudinal length of the top support 36. The carrier assembly 40 includes a vertical support assembly 42 and, at the bottom portion thereof when viewed from FIG. 3, a traversing member 50. The traversing member 50 is configured to describe a slot 52 that is slidably engaged to the top support 36 to enable the carrier assembly 40 to move along the top support 36.

Figure 3:
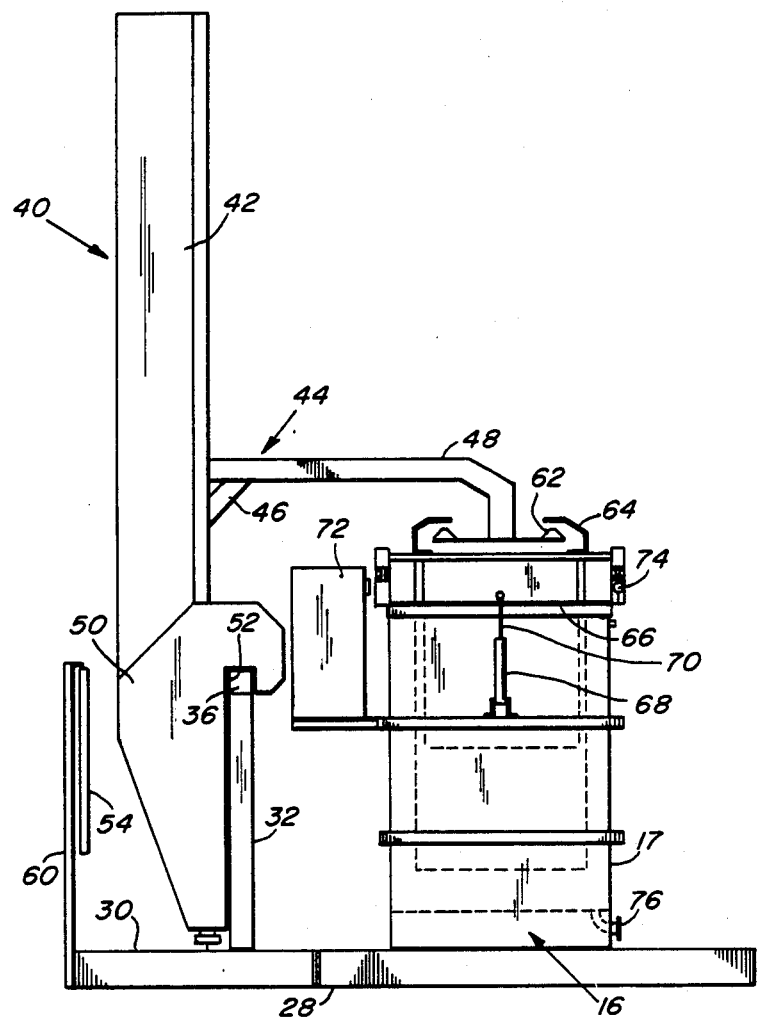
FIG. 3 is a cross-sectional view of the present invention showing a work station and a carrier assembly.

An arm assembly 44 is supported by the vertical support assembly 42 and includes a horizontal member 48 and a strut member 46. The horizontal member 48 is of a length sufficient to extend from the vertical support assembly 42 and to the various work stations, as shown in FIG. 3. A carrying arm 62 is fixed at the end of the horizontal member 48 which is disposed above the work stations, when viewed from FIG. 3. The carrying arm 62 is capable of holding a basket 64 that contains the pieces to be treated within the work stations, as seen in FIG. 3.

A back member 60 extends generally parallel to the top support 36 and supports an umbilical member 54 which, when connected to the carrier assembly 40, provides electrical power and signals to it.

A conventional computer network (not shown) is interfaced with the present invention to monitor the various sensing systems, manipulate the carrier assembly 40, control the washing, rinsing, and etching solution levels, and generally control the other process steps.

During use, an operator can manually load the pieces in the first station 10. The pieces are then automatically carried by the carrier assembly 40 from the first station 10 to the ninth station 26 where they are degreased. The pieces are then automatically carried from the ninth station 26 to the second station 12 where the pieces are heated. After heating, the pieces are then carried to the eighth station 24 where they are treated with the etchant solution. Then, the pieces are moved to the seventh station 22 where they are washed with the alcohol solution. Thereafter, the pieces are carried to the sixth station 20 where they are stagnant rinsed with reverse osmosis water. The next operation occurs in the fifth station 18 where the pieces are counter-flow rinsed with the reverse osmosis water. The pieces are then moved down to the fourth station 16 where they are again washed with the alcohol solution. Then, the pieces are placed in the third station 14 for another counter-flow rinse with reverse osmosis water. After moving back into the second station 12 for drying and then into the ninth station 26 for degreasing, the pieces are finally unloaded at the first station 10.

Concurrently, the alcohol washing solution is being recirculated from the fourth station 22, to the seventh station 16, through a treatment area, and then back to the fourth station 22. Also, the reverse osmosis water is being recirculated from the sixth station 20, through the treatment area, to the fifth station 18, to the third station 14, and then back to the sixth station 20.

As can be seen, the present invention provides a system for remotely etching pieces to permit their bonding, while at the same time increasing efficiency without exposing the operator to the various toxic compounds that are typically found in a system for etching.

The specifications above only describe only one preferred embodiment of the present invention, and it is contemplated that various modifications to the above can be effected but nevertheless come within the scope of the present invention as defined by the claims.

What is claimed is:

1. An improved automated method for the etching of pieces to permit bonding, comprising the steps of:
    moving the pieces among a plurality of work stations in the absence of an operator physically contacting the pieces during such moving, the step of moving the pieces including the steps of:
    exposing a plurality of functional groups on the surfaces of the pieces with an etchant solution;
    degreasing the surfaces of the pieces prior to and after exposing the functional groups;
    removing contaminants from the surfaces of the pieces with a washing solution and a rinsing solution after exposing the functional groups; and
    heating the pieces.

2. The invention of claim 1 wherein the step of degreasing includes the step of removing oils from the pieces.

3. The invention of claim 1 wherein the step of removing contaminants includes the step of removing degradation products resulting from the step of exposing functional groups.

4. The invention of claim 1 wherein the step of removing contaminants includes the step of washing the pieces in at least two stations, and recirculating the washing solution through the two stations.

5. The invention of claim 1 wherein the step of removing contaminants includes the step of rinsing the pieces in at least two stations, and recirculating the rinsing solution through the two stations.

6. The invention of claim 1 wherein the step of removing the contaminants includes the step of removing organic compounds.

7. The invention of claim 6 wherein the step of removing the contaminants includes the step of removing metallic elements.

8. The invention of claim 7 wherein the step of removing contaminants includes the step of removing carcinogenic compounds from the etchant solution.

9. The invention of claim 1 wherein the step of heating the pieces includes the step of drying the pieces.

10. An improved automated method for treatment of fluorocarbon pieces to permit bonding, comprising the steps of:
    degreasing the pieces;
    heating the pieces;
    removing fluorine from the surfaces of the pieces, the step of removing flourine occurring within a sealed environment;
    washing the pieces at least twice with a washing solution including an alcohol compound, the step of washing occurring within a sealed environment;
    rinsing the pieces with a rinsing solution at least twice, the rinsing solution including reverse osmosis water; and
    remotely controlling the steps of degreasing, heating, washing, and rinsing among a plurality of stations.

11. The invention of claim 10 wherein the step of removing flourine includes the step of exposing functional groups selected from the group consisting of hydroxyls, carbonyls, and carboxyls.

12. The invention of claim 11 wherein the step of exposing functional groups includes the step of contacting the pieces with an etchant solution that attracts flourine atoms.

13. The invention of claim 10 further comprising the step of loading and unloading the pieces at a first station.

14. The invention of claim 13 wherein the step of heating the pieces includes the steps of heating the pieces after the step of loading and again before the step of unloading.

15. The invention of claim 10 wherein the step of rinsing the pieces includes the steps of counterflow rinsing the pieces twice and stagnant rinsing the pieces once.

16. The invention of claim 15 wherein the step washing the pieces includes the steps of washing for a first time and for a second time, the washing for a second time occuring intermediate the two steps of counterflow rinsing.

17. The invention of claim 16 wherein the step of stagnant rinsing occurs after the step of washing for the first time.

18. The invention of claim 17 wherein the step of removing flourine occurs prior to the step of washing and rinsing.

19. An improved assembly for the etching of pieces to permit bonding, comprising:
    a first station for loading and unloading the pieces;
    a second station for drying and heating the pieces;
    at least one third station for washing the pieces;
    at least one fourth station for rinsing the pieces;
    a fifth station for altering the chemical composition of the surfaces of the pieces;
    a sixth station for degreasing the pieces; and
    means for remotely controlling the movement of the pieces among the stations.

20. The invention of claim 19 wherein the second station is immediately adjacent the first station.

21. The invention of claim 20 wherein a third station is immediately adjacent the second station.

22. The invention of claim 21 wherein there are two third stations, one being positioned on either side of the fourth station.

23. The invention of claim 21 wherein there are three third stations.

24. The invention of claim 23 wherein there are two fourth stations.

25. A remotely controlled assembly for the etching of pieces, comprising:
 a first station for loading and unloading the pieces;
 a second station for drying and heating the pieces, the second station immediately adjacent the first station;
 a third station for washing the pieces with a washing solution, the third station immediately adjacent the second station;
 a fourth station for rinsing the pieces with a rinsing solution, the fourth station immediately adjacent the third station;
 a fifth station for washing the pieces with a washing solution, the fifth station immediately adjacent the fourth station;
 a sixth station for washing the pieces with a washing solution, the sixth station immediately adjacent the fifth station;
 a seventh station for rinsing the pieces with a rinsing solution, the seventh station immediately adjacent the sixth station;
 an eighth station for altering the surface composition of the pieces, the eighth station immediately adjacent the seventh station; and
 a ninth station for degreasing the pieces, the ninth station immediately adjacent the eighth station.

26. The invention of claim 25 further including means for counterflowing the washing solution in the third station and the fifth station.

27. The invention of claim 26 further including means for recirculating the washing solution between the third station and the fifth station.

28. The invention of claim 25 further including means for recirculating the rinsing solution between the fourth station and the seventh station.

29. The invention of claim 28 further including means for sealing an environment interiorly of the fourth station and the seventh station.

30. The invention of claim 29 further including means for suppressing fires within the fourth station.

31. The invention of claim 30 further including means for condensing gaseous compounds within the fourth station and the seventh station.

32. The invention of claim 31 further including means for purging gaseous compounds from the interiors of the fourth station and the seventh station.

33. The invention of claim 25 further including means for aerating the washing solution within the third station, the fifth station, and the sixth station.

34. The invention of claim 25 further including means for heating the interior of the second station to a temperature in excess of 100° F.

35. The invention of claim 25 further including means for sealing an environment interiorly of the eighth station.

36. The invention of claim 35 further including means for heating and cooling the interior of the eighth station.

37. The invention of claim 36 further including means for suppressing fires within the eighth station.

38. The invention of claim 37 further including a first means for sensing the presence of oxygen within the eighth station.

39. The invention of claim 38 further including a second means for sensing humidity within the eighth station.

40. The invention of claim 39 further including a third means for sensing the amount of alteration of the surface composition of pieces within the eighth station.

41. The invention of claim 40 further including a means for purging gaseous compounds within the eighth station.

42. The invention of claim 41 further including a fourth means for sensing light-absorbing constituents within the eighth station.

43. The invention of claim 42 further including a fifth sensing means for sensing the viscosity of a solution within the eighth station.

44. The invention of claim 43 further including means for condensing gaseous compounds within the eighth station.

45. The invention of claim 44 further including a means for providing freon a fluorinated carbon gas within the ninth station.

* * * * *